United States Patent
Chhuor et al.

(10) Patent No.: US 11,507,359 B2
(45) Date of Patent: Nov. 22, 2022

(54) PERFORMING FIRMWARE UPDATES USING BLOCKCHAIN

(71) Applicant: LENOVO Enterprise Solutions (Singapore) PTE. LTD., New Tech Park (SG)

(72) Inventors: Chekim Chhuor, Shanghai (CN); Zhi Jun Liu, Shanghai (CN); Wen Wei Tang, Shanghai (CN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/545,831

(22) Filed: Aug. 20, 2019

(65) Prior Publication Data

US 2020/0057626 A1 Feb. 20, 2020

(30) Foreign Application Priority Data

Aug. 20, 2018 (CN) .......................... 201810947789.X

(51) Int. Cl.
| | |
|---|---|
| G06F 8/65 | (2018.01) |
| H04L 9/06 | (2006.01) |
| H04L 9/00 | (2022.01) |

(52) U.S. Cl.
CPC .............. *G06F 8/65* (2013.01); *H04L 9/0637* (2013.01); *H04L 9/0643* (2013.01); *H04L 9/50* (2022.05)

(58) Field of Classification Search
CPC ........ G06F 8/60; G06F 8/65–66; G06F 21/64; H04L 9/0637; H04L 9/0643
USPC ........................................................ 717/168
See application file for complete search history.

(56) References Cited

U.S. PATENT DOCUMENTS

| | | | |
|---|---|---|---|
| 10,365,922 B1* | 7/2019 | Wang | H04L 63/123 |
| 10,698,675 B2* | 6/2020 | Bathen | G06F 8/65 |
| 10,732,957 B2* | 8/2020 | Dattatri | H04L 43/0817 |
| 2005/0132351 A1* | 6/2005 | Randall | G06F 11/1433 |
| | | | 717/168 |
| 2006/0123040 A1* | 6/2006 | McCarthy | G06F 8/60 |
| 2012/0102481 A1* | 4/2012 | Mani | G06F 9/45504 |
| | | | 717/172 |
| 2013/0125107 A1* | 5/2013 | Bandakka | G06F 11/1448 |
| | | | 717/171 |
| 2014/0201218 A1* | 7/2014 | Catalano | H04L 41/5045 |
| | | | 707/748 |
| 2016/0261690 A1* | 9/2016 | Ford | H04L 9/3239 |
| 2017/0034023 A1* | 2/2017 | Nickolov | H04L 43/0817 |

(Continued)

*Primary Examiner* — Jason D Mitchell
(74) *Attorney, Agent, or Firm* — Kunzler Bean & Adamson; Bruce R. Needham

(57) ABSTRACT

A method of data transfer over a communication network from a first information handling apparatus to a plurality of second information handling apparatuses includes generating, by the first information handling apparatus, an initial block and initializing, based on the initial block, a ledger. The method includes broadcasting the ledger to the plurality of second information handling apparatuses, and attempting to compute a new block, by each one of the plurality of second information handling apparatuses. Upon one of the plurality of second information handling apparatuses successfully computing said new block, the method then transmits data to the one of the plurality of second information handling apparatuses and updates the ledger based on the new block.

18 Claims, 6 Drawing Sheets

(56) References Cited

U.S. PATENT DOCUMENTS

| | | | |
|---|---|---|---|
| 2017/0142232 A1* | 5/2017 | Banerjee | G06F 8/65 |
| 2017/0161062 A1* | 6/2017 | Banerjee | G06F 11/34 |
| 2018/0137306 A1* | 5/2018 | Brady | G06F 8/65 |
| 2018/0232254 A1* | 8/2018 | Mohan | G06F 3/0647 |
| 2018/0302303 A1* | 10/2018 | Skovron | G06F 11/0748 |
| 2018/0331973 A1* | 11/2018 | Mani | H04L 47/76 |
| 2019/0250949 A1* | 8/2019 | Chen | H04L 41/082 |
| 2019/0349426 A1* | 11/2019 | Smith | G06F 16/1824 |
| 2019/0384587 A1* | 12/2019 | Rao | G06F 9/445 |
| 2020/0019393 A1* | 1/2020 | Vichare | G06N 20/00 |
| 2020/0034133 A1* | 1/2020 | Dattatri | G06F 8/61 |
| 2020/0057626 A1* | 2/2020 | Chhuor | H04L 9/3239 |
| 2020/0073651 A1* | 3/2020 | Rodriguez Bravo | H04L 63/00 |
| 2020/0143300 A1* | 5/2020 | Weldemariam | H04L 9/0637 |
| 2020/0162324 A1* | 5/2020 | Amburey | H04L 9/3239 |
| 2020/0186524 A1* | 6/2020 | Zhou | G06F 16/27 |
| 2020/0252204 A1* | 8/2020 | Shi | G06Q 40/04 |
| 2020/0259844 A1* | 8/2020 | Guan | H04L 9/3239 |

\* cited by examiner

PERFORMING FIRMWARE UPDATES USING BLOCKCHAIN

CROSS-REFERENCE TO RELATED APPLICATIONS

This patent application claims priority to China Patent Application No. 201810947789.X filed on Aug. 20, 2018 for CheKim Chhuor, the entire contents of which are incorporated herein by reference for all purposes.

FIELD

The subject matter disclosed herein relates to firmware update mechanisms for multiple information handling apparatuses, and in particular automatic rolling out and installation of firmware to multiple information handling apparatuses.

BACKGROUND

In large datacenters with massive rows of computing facilities like servers, periodical firmware maintenance is one of the biggest burdens for IT administrators, since it is laborious and risky. Often, to comply with vendor support policies, the IT administrator must maintain firmware of servers at relatively up-to-date version, regardless whether there is any benefit or not. Take an example of a 10,000 servers farm running a mixture of workloads (e.g. a small public cloud region, or a large private cloud), upgrading firmware of them all is a huge task to be scheduled properly without affecting customer service-level agreement (SLA).

Given the limited maintenance window available in today's 24×7 global operation of companies, IT administrators must apply the firmware update in small batches (e.g. 500 servers), and learn from each batch's result to fine tune the next batch. It's risky for the business if a bad firmware release affects too many servers, causing a reduction of available resources. As a result, the IT administrator has to orchestrate every step of firmware update centrally by writing complex logic.

BRIEF SUMMARY

Accordingly, the present invention, in one aspect, is a method of data transfer over a communication network from a first information handling apparatus to a plurality of second information handling apparatuses. The method includes the steps of generating, by the first information handling apparatus, an initial block and initializing, based on the initial block, a ledger. The method includes broadcasting the ledger to the plurality of second information handling apparatuses and attempting to compute a new block, by each one of the plurality of second information handling apparatuses. Upon one of the plurality of second information handling apparatuses successfully computing said new block, the method then transmits data to the one of the plurality of second information handling apparatuses and updates the ledger based on the new block.

In a second aspect of the present invention, there is provided a system comprising a first information handling apparatus and a plurality of second information handling apparatuses interconnected to each other by a communication network. The first information handling apparatus is adapted to generate an initial block, initialize a ledger based on the initial block, and broadcast the ledger to the plurality of second information handling apparatuses. Each of the plurality of second information handling apparatuses is adapted to attempt to compute a new block. Upon one of the plurality of second information handling apparatuses successfully computing the new block firstly, the one of the plurality of second information handling apparatuses is further adapted to receive data from a first data address on the communication network, and update the ledger based on the new block.

In a third aspect of the present invention, there is disclosed an information handling apparatus which includes a processor and a network device. The network device is adapted to connect to a communication network. The processor is operable to implement a method comprising: receiving a ledger from a first external apparatus where the ledger includes an initial block, computing a new block, upon a successful computation of the new block, receiving data from a first data address on the communication network via the network device, updating the ledger based on the new block, and broadcasting the ledger to a second external apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

In the drawings, like numerals indicate like parts throughout the several embodiments described herein.

DETAILED DESCRIPTION

Figure 1:
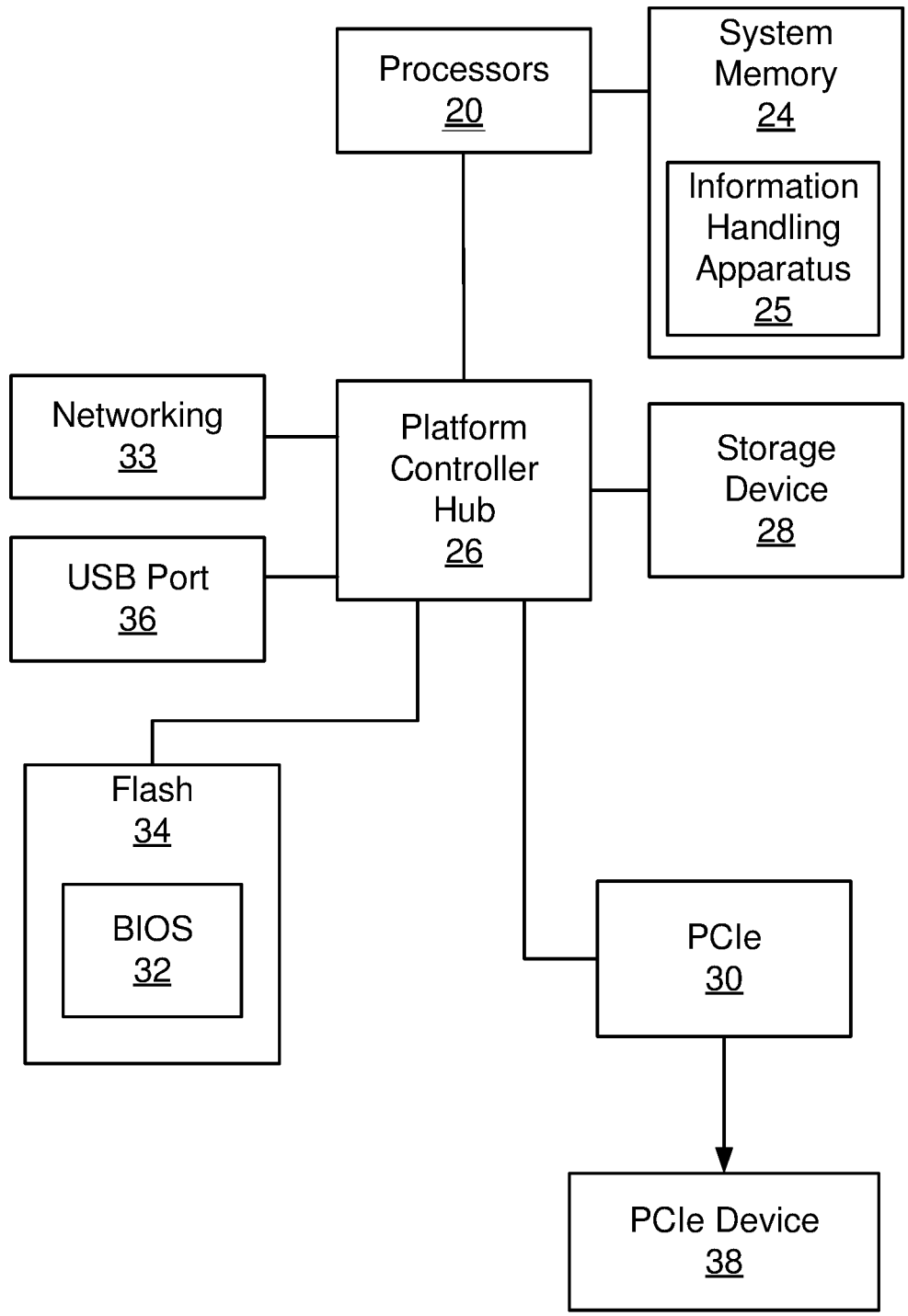
FIG. 1 shows a block diagram for the internal structure of a computing device according to an embodiment of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic random access memory (DRAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Accordingly, in one embodiment, a method of data transfer over a communication network from a first information handling apparatus to a plurality of second information handling apparatuses is presented. The method includes the steps of generating, by the first information handling apparatus, an initial block and initializing, based on the initial block, a ledger. The method includes broadcasting the ledger to the plurality of second information handling apparatuses, and attempting to compute a new block, by each one of the plurality of second information handling apparatuses. Upon one of the plurality of second information handling apparatuses successfully computing said new block, the method then transmits data to the one of the plurality of second information handling apparatuses, and updates the ledger based on the new block.

In some embodiments, the transmitted data includes a firmware payload for the plurality of second information handling apparatuses. In other embodiments, the method further includes, after the transmitting step, the step of updating a firmware of the one of the plurality of second information handling apparatuses. In other embodiments, the method further includes, after the step of updating the firmware, the step of adding result of the updating step into the new block. In other embodiments, the step of updating the firmware further includes the steps of 1) checking past update information, if any, in the ledger, and 2) making a decision of firmware update.

In one implementation, the past update information contains update statistics and past hardware configurations associated with the update statistics. The step of making the decision further includes calculating a possibility of a successful update based on the update statistics and similarities between a hardware configuration of the one of the plurality of second information handling apparatuses and the past hardware configurations. In other embodiments, the initial block contains a first data address via which the firmware is downloadable by the plurality of second information handling apparatuses. In other embodiments, the new block contains a second data address which is different from the first data address. In other embodiments, the plurality of second information handling apparatuses is divided into a plurality of groups. The steps of attempting, transmitting, updating the ledger and repeating are completed for one of the plurality of groups before being performed for other ones of the plurality of groups.

In a second aspect of the present invention, there is provided a system comprising a first information handling apparatus and a plurality of second information handling apparatuses interconnected to each other by a communication network. The first information handling apparatus is adapted to generate an initial block, initialize a ledger based on the initial block, and broadcast the ledger to the plurality of second information handling apparatuses. Each of the plurality of second information handling apparatuses is adapted to attempt to compute a new block. Upon one of the plurality of second information handling apparatuses successfully computing the new block firstly, the one of the plurality of second information handling apparatuses is further adapted to receive data from a first data address on the communication network, and update the ledger based on the new block.

In some embodiments, the transmitted data contains a firmware payload for the plurality of second information handling apparatuses. In other embodiments, the one of the plurality of second information handling apparatuses is further adapted to update its firmware based on the firmware payload. In other embodiments, the one of the plurality of second information handling apparatuses is further adapted to add result of its firmware update into the new block. In other embodiments, the one of the plurality of second information handling apparatuses is further adapted to check past update information, if any, in the ledger, and make a decision of firmware update before updating the firmware.

In some embodiments, the past update information includes update statistics and past hardware configurations associated with the update statistics. The one of the plurality of second information handling apparatuses is further adapted to calculate a possibility of a successful update based on the update statistics and similarities between a hardware configuration of the one of the plurality of second information handling apparatuses and the past hardware configurations. In other embodiments, the initial block contains the first data address via which the firmware is downloadable by the plurality of second information handling apparatuses. In other embodiments, the new block includes a second data address which is different from the first data address.

In a third aspect of the present invention, there is disclosed an information handling apparatus which includes a processor and a network device. The network device is adapted to connect to a communication network. The processor is operable to implement a method comprising: receiving a ledger from a first external apparatus where the ledger includes an initial block, computing a new block, upon a successful computation of the new block, receiving data from a first data address on the communication network via the network device, updating the ledger based on the new block, and broadcasting the ledger to a second external apparatus.

In some embodiments, the transmitted data includes a firmware payload for the information handling apparatus. In other embodiments, the processor is further operable to implement a method including updating a firmware of the information handling apparatus based on the firmware payload. In other embodiments, the processor is further operable to implement a method including adding result of the updating into the new block. In other embodiments, the processor is further operable to implement a method including the steps of: checking past update information, if any, in the ledger, and making a decision of firmware update before updating the firmware.

In some embodiments, the past update information contains update statistics and past hardware configurations associated with the update statistics. The processor is further operable to implement a method including calculating a possibility of a successful update based on the update statistics and similarities between a hardware configuration of the information handling apparatus and the past hardware configurations. In other embodiments, the initial block includes the first data address via which the firmware is downloadable by the information handling apparatuses. In other embodiments, the new block contains a second data address which is different from the first data address.

According to a fourth aspect of the present invention, there is disclosed a non-transitory computer-readable medium storing computer-executable programs that, when executed by a processor, cause an information processing apparatus to perform: receiving a ledger from external apparatus where the ledger contains an initial block, computing a new block, upon a successful computation of the new block, receiving data from a first data address on the communication network via the network device, updating the ledger based on the new block, and broadcasting the ledger to the external apparatus.

In some embodiments, the data contains a firmware payload for the information handling apparatus. In other embodiments, the computer-executable programs, when executed by the processor, further cause the information processing apparatus to perform updating a firmware of the information handling apparatus based on the firmware payload. In other embodiments, the computer-executable programs, when executed by the processor, further cause the information processing apparatus to perform adding result of the updating into the new block. In other embodiments, the computer-executable programs, when executed by the processor, further cause the information processing apparatus to perform checking past update information, if any, in the ledger, and making a decision of firmware update before updating the firmware.

In other embodiments, the past update information contains update statistics and past hardware configurations associated with the update statistics. The computer-executable programs, when executed by the processor, further cause the information processing apparatus to perform calculating a possibility of a successful update based on the update statistics and similarities between a hardware configuration of the information handling apparatus and the past hardware configurations. In other embodiments, the initial block includes a first data address via which the firmware is downloadable by the information handling apparatuses. In other embodiments, the new block contains a second data address which is different from the first data address.

The present invention therefore decentralizes the firmware update process of nodes in a data center. It enables automatic firmware update decision autonomously done by each device of which firmware needs to be updated, without relying on the IT administrator to manually manage the update process. Almost no IT administrator's involvement is needed, and what the IT administrator needs to do is to roll out the firmware payload initially to any of the nodes in the datacenter (e.g. a server farm). Therefore, any potential attack targeting central management server can be mitigated.

The firmware update decisions made by the nodes are ledger-driven, where the nodes leverage information in ledger and preset algorithm. By the broadcasting of the ledger, firmware update log is stored in every single node, which is more comprehensive and reliable. In other words, upgrade statistics could be accumulated in ledger and broadcasted to all the server nodes to ease decision making of firmware update. As a result, it becomes less risky by updating firmware all the time in very small number of nodes and stop at an error threshold, as opposed to the conventional method of running a firmware update in a batch of hundreds of nodes and repeat that only a few times for the whole data center, which would result in the loss of a large capacity of servers during the maintenance window, as well as the risk that the nodes in the batch may fail all at once.

The present invention utilizes the blockchain technology to randomize the firmware update time, thus spreading the firmware payload downloading operations along the time scale relatively homogeneously, which minimizes the impact to workload and power supply stability. There is also no concentrated requirement on bandwidth for downloading firmware payload. This removes the bottleneck created by firmware payload downloading, and largely improves the firmware update efficiency. Together with VM migration technology, one could enable rolling update to apply non-stop process to a large farm of similar servers, with the least amount of disruption to workload and no more maintenance windows is required.

FIG. 1 illustrates an embodiment of a computing device which implements the principles of the present application. The computing device, in some embodiments, include one or more processors 20. The processors 20 include any type of processors capable of executing software and/or process data signals. The processors 20, in some embodiments, are coupled to system memory 24 via a memory path for instruction and data storage and/or for storage of, e.g., graphics commands, data and textures. The system memory 24 includes an information handling apparatus 25 that includes program code to implement the embodiments described below with regard to FIGS. 2-6. The processor 20, in some embodiments, are coupled to one or more peripheral devices 38 via PCIe ports (not shown) coupled to a PCIe interconnect 30. The system memory 24 may be a hard disk, a floppy disk, random access memory (RAM), read only memory (ROM), flash memory, or any other type of medium readable by processors 20. The RAM may further include Non-volatile random-access memory (NVRAM), and/or dynamic random-access memory (DRAM) and static random-access memory (SRAM).

The processors 20 may refer to more than one processor in the computing device, or one or more processors which may include multiple threads, multiple cores, or the like. The present enhancement is not limited to computer systems or data processing device systems. Alternative embodiments of the present invention can be used in any form factor devices that uses unified extensible firmware interface (UEFI) Basic Input/Output System (BIOS), such as handheld devices and embedded applications. Some examples of handheld devices include cellular phones, tablet computers, Internet Protocol devices, digital cameras, personal digital assistants (PDAs), or handheld PCs such as netbook or notebook. Embedded applications can include a micro controller, a digital signal processor (DSP), system on a chip, network computers (NetPC), set-top boxes, network hubs, wide area network (WAN) switches, or any other system.

The processors 20 may be coupled to a system logic chip 26. For example, the system logic chip 26, shown in the illustrated embodiment as a platform controller hub (PCH). In one embodiment, the PCH 26 may provide connections to one or more I/O devices, e.g., via a local I/O interconnect. In an embodiment, the local I/O interconnect may be a high-speed I/O bus, such as peripheral component interconnect (PCI) Express bus (PCIe). The PCH 26 may direct data signals or other information between the processor(s) 20 and one or more other components in the computing device and bridge the data signals or information between processor 20 and system I/O.

Some examples of the one or more components may include a data storage device 28, one or more PCIe port (not shown), a networking controller 33, a universal serial bus (USB) port 36, etc. In one embodiment, the data storage device 28 may include a hard disk drive, a floppy disk drive, a CD-ROM device, a flash memory device, or other mass storage device. Although FIG. 1 shows some examples of possible components, the PCH 26 may provide connections to other components, such as audio I/O, keyboard/mouse I/O, and other integrated I/O components such as integrated driver electronics (IDE), local area network (LAN) and other serial expansion port, wireless transceiver, legacy I/O controller or the like.

Referring to FIG. 1, non-volatile memory, such as flash memory 34, may be coupled to PCH 26 via, e.g., a low pin count (LPC) bus. BIOS firmware 32 may reside in flash memory 34 and boot up may execute instructions from the flash memory, or firmware. Although FIG. 1 illustrates BIOS firmware 32 in flash memory 34, in some embodiments, the BIOS firmware 32 may be stored in other non-volatile memory such as a firmware hub, or the like. In an embodiment, the BIOS firmware 32 may be implemented by Unified Extensible Firmware Interface (UEFI) firmware or any other firmware interface between the operation system and the hardware of the computing device.

Although FIG. 1 illustrates a computing device, the embodiments according to the invention may be used in any other hardware and software architecture such as a platform using a plurality of processor cores or a platform using a processor or a coprocessor, a platform using I/O hubs, or memory control embedded within the processors, or the like, may be used.

Figure 2:
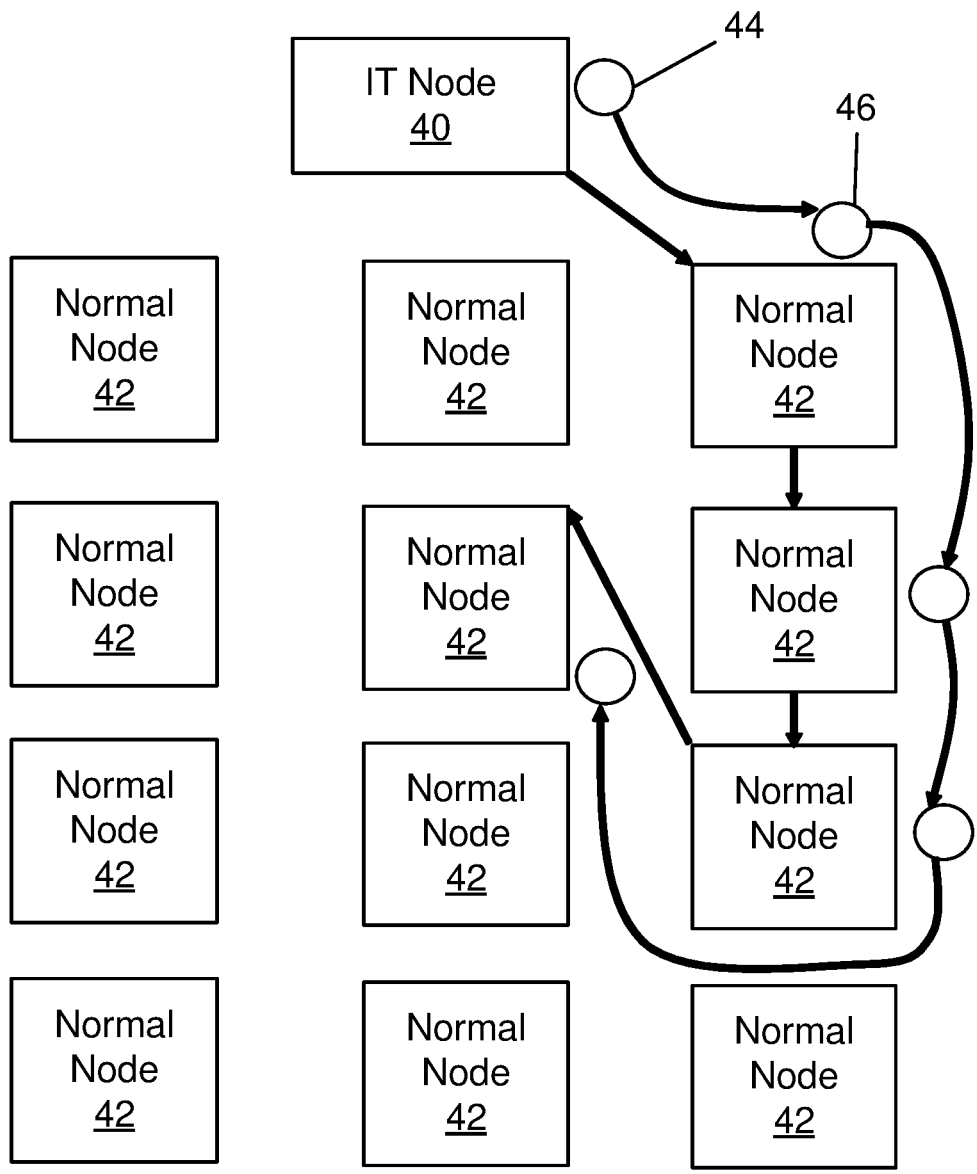
FIG. 2 illustrates different nodes in a datacenter and the sequence of block creation according to another embodiment of the present invention.

Turning now to FIG. 2, which shows in general the layout of a datacenter to which an embodiment of the present invention may apply. There are a plurality of information handling apparatuses 42 which are computing devices as mentioned above, and for example the information handling apparatuses 42 can be servers, networking computing modules, storage and/or other datacenter devices. It should be noted that there is no limitation to the type of information handling apparatus 42 to which the present invention may apply to. Rather, as long as the information handling apparatuses 42 each contains a firmware which can be updated, then such firmware update can be completed using the method described herein. The information handling apparatuses 42 are interconnected via a network (not shown) and for this reason the information handling apparatuses 42 are also called normal nodes. In addition, there is one or more IT nodes 40 (only one is shown in FIG. 2) which are dedicated computing devices operated by IT administrators to manage all information handling apparatuses 42 as well as the network.

Also shown in FIG. 2 is a sequence of block generation. The firmware update process starts at an IT node 40 with an initial block 44 created by the IT node 40, and then various information handling apparatuses 42 perform their firmware update sequentially, with a new block 46 generated each time by an information handling apparatus 42 after this information handling apparatus 42 attempts to update its firmware. Details of the firmware update process in FIG. 2 will be described below.

Figure 4:
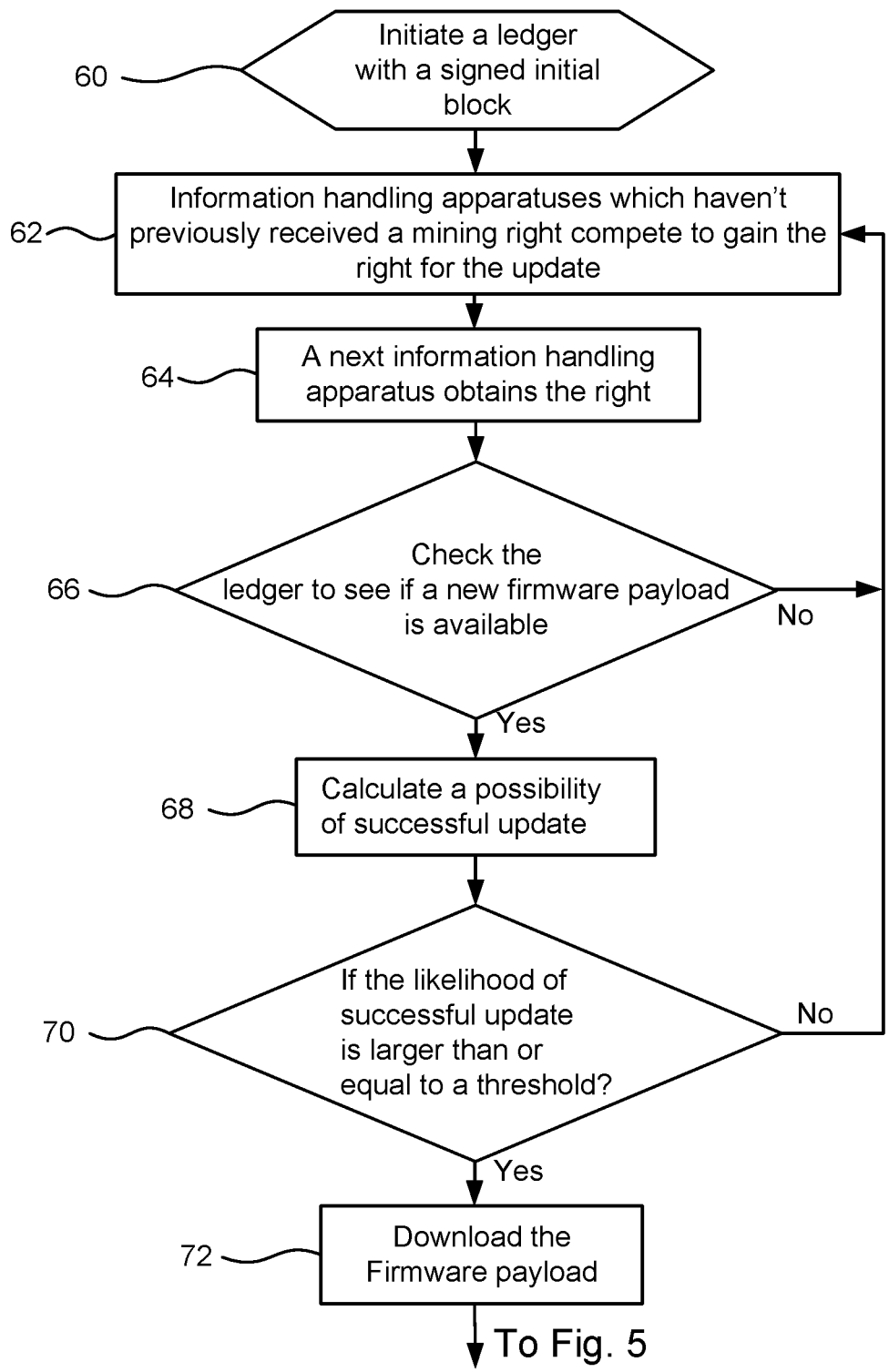
FIG. 4 is a first part of a flowchart showing a method of distributing firmware payloads to different nodes in a network using the blockchain technology.
Figure 5:
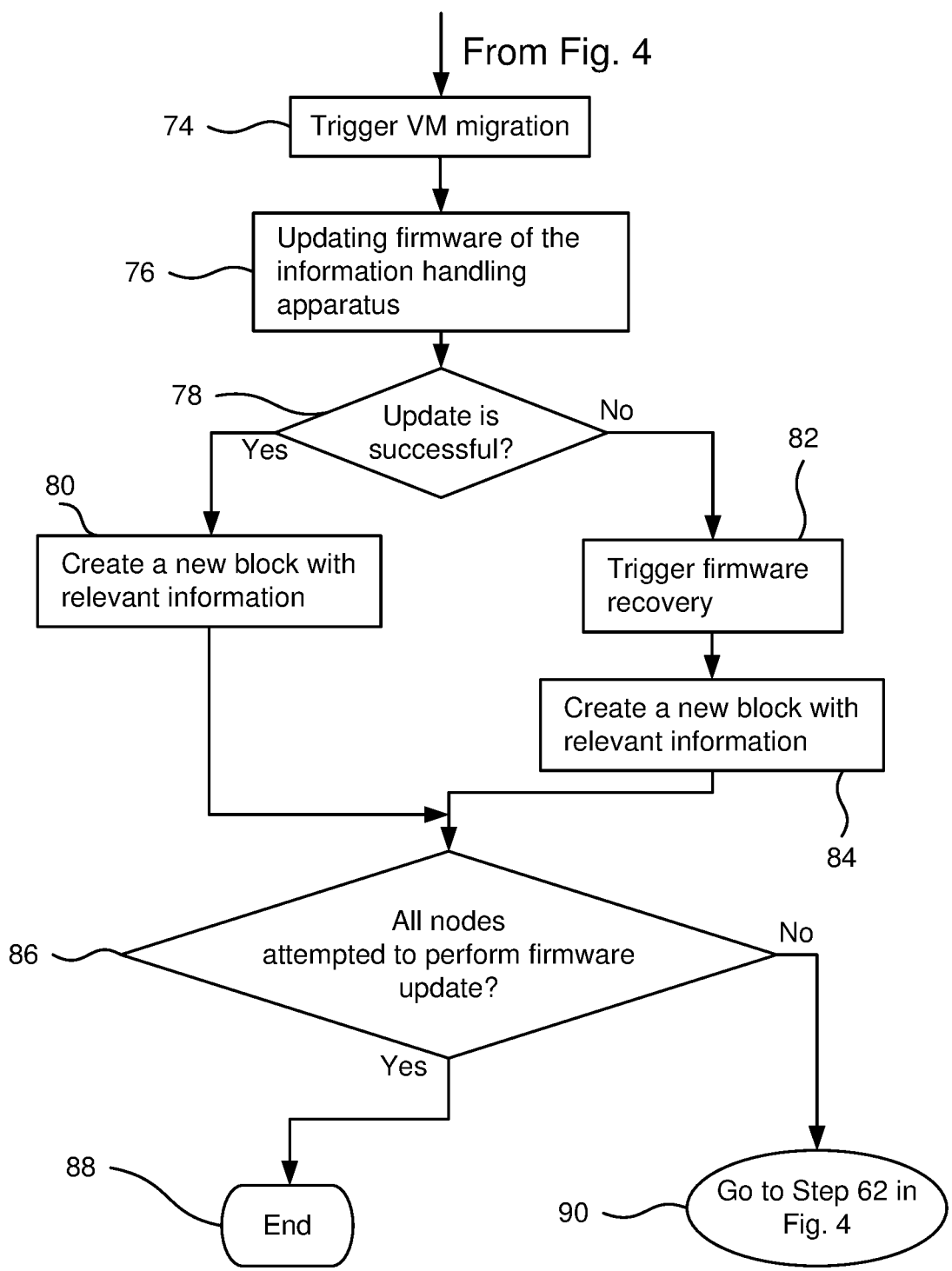
FIG. 5 is a second part of a flowchart showing a method of distributing firmware payloads to different nodes in a network using the blockchain technology.

Turning to FIGS. 4 and 5, which illustrate method steps of the firmware update process using blockchain technology for the datacenter as shown in FIG. 2. The blockchain technology, or Distributed Ledger Technology (DLT) itself, is well-known to people in the Internet industry for other uses. As a first step, the IT administrator initializes a ledger for the firmware update process at an IT node 40 in Step 60. The ledger is a digital file represented as cryptographic codes, or hashes, which records all the transactions of a blockchain, and consists of a chain of blocks (although initially there is only one block in the chain). The IT administrator is the party which initiates the blockchain by using the IT node 40 to create a signed initial block 44 of the blockchain.

Figure 3:
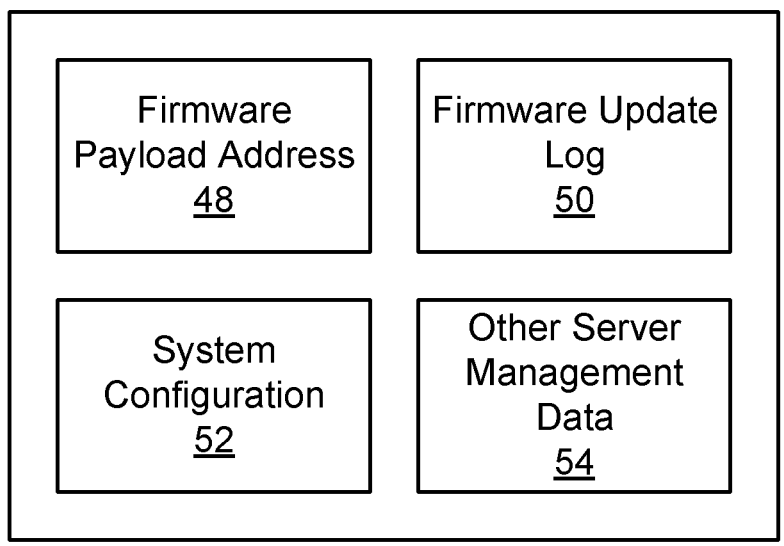
FIG. 3 shows the structure of a block created in the method of FIG. 2.

Blocks created in the method illustrated in FIGS. 2 and 4-5, including the initial block 44 and subsequent blocks 46, are illustrated in detail in FIG. 3. The blocks each contain information including but not limited to a firmware payload address 48, a firmware update log 50, a system configuration 52, and other server management data 54. The firmware payload address 48 is a link to the firmware payload stored in a node of the network through which an information handling apparatus 42 could download the firmware payload for updating. The firmware update log 50 in a block contains a record of a firmware update by the same node which created the corresponding block, for example whether the firmware update is successful or failed. The system configuration 52 in a block contains hardware information of the node which created the corresponding block.

For the initial block 44, the firmware payload address 48 may point to an original location in the IT node 40 where the firmware payload is stored. Also, there is no content in the firmware update log 50 since presumably the IT node 40 does not require a firmware update when other information handling apparatuses 42 have to do so in a batch. The system configuration 52 in the initial block 44 may contain the specification of an eligible computing device to which the firmware update is applicable, as provided by the IT administrator.

Turning back to FIG. 4, after the initial block 44 has been created, the ledger (which contains only the initial block 44 for now) is broadcast by the IT node 40 to all other information handling apparatuses 42 in the network intended to be updated, those which have not mined any right to conduct firmware update then compete to solve a difficult mathematical problem based on a cryptographic hash algorithm in Step 62—a.k.a. "mining," just as in any other blockchain application. An information handling apparatus 42 which computes an answer fastest among all competing information handling apparatuses 42 obtains the right to conduct a firmware update next. Note that the answer that can be computed is not unique, but it is unique to each block. Once an information handling apparatus 42 computes an answer faster than any other information handling apparatuses 42, the information handling apparatus 42 broadcasts its finding to all other nodes in the network, where the latter is able to verify rather quickly if the information handling apparatus 42 has indeed obtained a correct answer. If yes, then the information handling apparatus 42 obtains the right to perform firmware update in Step 64, and all the other information handling apparatuses 42 immediately stop mining until further notice. If no (i.e. the answer is not correct), then the other information handling apparatuses 42 continue mining until a further answer is found and verified.

Complexity of the mathematical problem set for mining can be determined in advance to estimate an average time for information handling apparatuses 42 to find every new answer to the mathematical problem, e.g. 10 minutes. It is prudent to set the average time long enough so that each information handling apparatus 42 would have sufficient time to download the firmware payload and also to conduct the firmware update. In addition, it is very unlikely that two information handling apparatuses 42 will successfully mine answers to the mathematical problem at exactly the same time, but if this does happen, then the ledger will be updated based on the longest chain, which means the chain having more blocks at any given time after further blocks were separately built on the basis of the two simultaneous answers will win, and be treated as the authentic chain.

Once an information handling apparatus 42 obtains the right to perform firmware update in Step 64, the information handling apparatus 42 starts its firmware update process. Firstly, in Step 66 the information handling apparatus 42 checks whether there is a new firmware for itself via the firmware payload address 48 in the initial block 44. If not, then the method goes back to Step 62 in which remaining information handling apparatuses 42 compete again in mining to obtain the next right to update firmware.

If, however, the result of Step 66 is yes, then in Step 68 the information handling apparatus 42 calculates a likelihood of a successful firmware update, for example based on the recommended/eligible specification of hardware components stored in the system configuration 52 of the initial block 44. The calculation also takes into consideration past update information (e.g. statistics of successful updates by other nodes). Note that as mentioned above, the content of the firmware update log 50 resides in the initial block 44 so this will not give the information handling apparatus 42 any help. The computed likelihood is then compared with a predetermined threshold in Step 70, and if the computed likelihood is larger than or equal to the predetermined threshold, then the information handling apparatus 42 makes a decision of a firmware update to proceed to conduct the firmware update. Otherwise, if the computed likelihood is smaller than the predetermined threshold, then the information handling apparatus 42 makes a decision of not to proceed with the firmware update.

If the information handling apparatus 42 proceeds to conduct firmware update in Step 70, then firstly the information handling apparatus 42 downloads the firmware payload via the firmware payload address 48 in Step 72. After the firmware payload is downloaded, then the information handling apparatus 42 in Step 74 triggers Virtual Machine (VM) migration. The live VM migration enables a virtual system to continue running without being interrupted by migrating the VM to a different device when the information handling apparatus 42 is performing a firmware update. After the VM migration, the information handling apparatus 42 starts the actual firmware update in Step 76 and determines 78 if the update is successful. It should be noted that the firmware update may not always be successful even if the likelihood of success has been computed before for the information handling apparatus 42, for example the update may fail when there is a sudden power outage, or the downloaded firmware payload has a defect, etc.

If the update was indeed successful, then the information handling apparatus 42 creates a new block in Step 80, but even if the update was not successful, the information handling apparatus 42 after necessary recovery actions (e.g. restoration of firmware, reboot, etc.) in Step 82 still creates a new block in Step 84. The new block created in Step 80 or 84 has a structure similar to that as shown in FIG. 3, and FIG. 2 shows the sequence of creations of new blocks 46 which is in line with sequence of information handling apparatus 42 which have mined the right for update. However, when compared to an initial block in FIG. 2, the new block created by the information handling apparatus 42 has some differences.

Firstly, the firmware payload address 48 in the initial block may contain only one initial address, but as more and more normal information handling apparatuses 42 have successfully updated their firmware, these information handling apparatuses 42 could also contribute to the firmware payload by hosting a clone of the firmware payload and allow other nodes to download the firmware payload. In the latter case the firmware payload address 48 in any new block may have more than just one initial address. In addition, the result of the update was determined in Step 78, and no matter if the update is a success or a failure, this information will be used to make the firmware update log 50 in the new block. The system configuration 52 will also be modified/updated by including the current system configuration of the information handling apparatus 42 that has just attempted the firmware update. Lastly, when a new block is created by the information handling apparatus 42, a timestamp and a link to a previous block via its hash are added to the ledger. In this way the ledger is updated based on the new block.

As soon as the new block has been created, the updated ledger is then broadcast by the information handling apparatus 42 to all other nodes. In Step 86 if there are other information handling apparatuses 42 which have not mined a right to attempt firmware update, then they will start to mine to compete for the next right, and in Step 90 the method goes back to Step 62. Otherwise, if all information handling apparatuses 42 have mined a right to attempt the firmware update (irrespective of whether the update was successful or not), then the whole method ends in Step 88. All information handling apparatuses 42 which are intended to conduct the firmware update have to mine for the right to update so the method steps between 62 and 90 will iterate for many times, and during each iteration a new block which is linked to a previous block will be created, effectively forming the blockchain (a.k.a. the ledger). As a copy of the ledger is stored in each of the nodes, all the nodes will have access to information stored in each block of the ledger including the firmware update logs and system configurations. The firmware update logs of different information handling apparatuses 42 for example become useful update statistics for later information handling apparatuses 42 to use to determine the likelihood of successful updates. Note that the method of FIGS. 4 and 5 may be applied to all information handling apparatuses 42 or to a subset of information handling apparatuses that is selected for an update.

Figure 6:
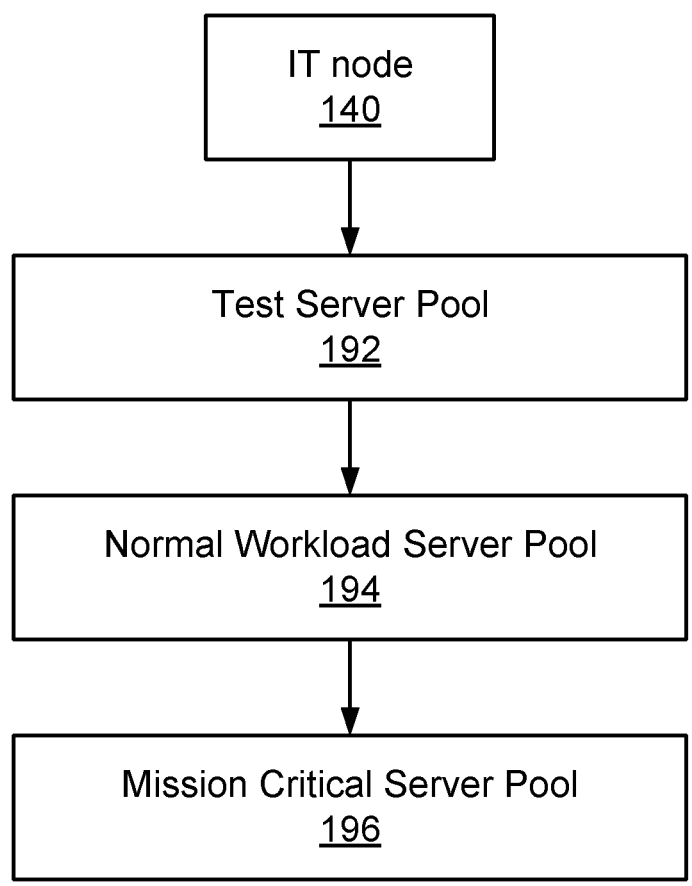
FIG. 6 shows different nodes in a datacenter are grouped for carrying out firmware update according to another embodiment of the present invention.

Turning to FIG. 6, which shows that a sequence of performing a firmware update for a datacenter consists of several different groups of servers according to another embodiment of the invention. The whole blockchain again starts at an IT node 140, but instead of all servers in the datacenter starting to compete for the right of update immediately, they are separated based on the groups which the servers belong to. Firstly, it is the servers in the test server pool 192 which will start mining first, and these test servers are configured to verify the feasibility of firmware update since if the tests failed, there is probably no reason to continue the firmware update for the other, majority of servers in the datacenter. If all or most servers in the test server pool 192 successfully update their firmware, then next the normal workload server pool 194 will start mining for an update, and lastly the mission critical server pool 196. The mission critical server pool 196 is put at the last position since servers in this pool are of critical importance to the operation of the datacenter and they should be placed to the last sequence when most other servers have updated the firmware which could provide a good indication of the likelihood of success or for example provide most backup firmware payload download addresses.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

First of all, in the embodiments described above the start of the blockchain is at an IT node, which produces an initial block and/or provide a hosing of the firmware payload. However, it should be realized that the first node of the firmware update process may not necessarily be the IT node. In fact, any other node, like a normal information handling apparatus, can be the initial node where the IT administrator chooses to start the firmware update sequence.

In addition, the above embodiments are described as an example of firmware update process for a single firmware payload which is applicable to all nodes in the datacenter. However, those skilled in the art should realize that different firmware for different types of computing devices may also be rolled out in a similar manner. This, for example, can be realized by providing dedicated downloading addresses for each firmware payload in the blocks of a single firmware process (i.e. a single blockchain) so that different information handling apparatuses can download their respective firmware payload, but the mining process is the same and fair to each of them. Alternatively, there can be different firmware update processes with different blockchains, so for each blockchain only a specific firmware payload is rolled out.

The above embodiments mentioned using VM technology to dynamically migrate VMs during firmware update. However, this is not absolutely necessary as in other variations, there could be no VM migration during firmware update of the information handling apparatus, although this means that the normal workload of the information handling apparatus will be interrupted.

What is claimed is:
1. A method comprising:
receiving a broadcast comprising a ledger;
competing, at an information handling apparatus of a plurality of information handling apparatuses, with other of the plurality of information handling apparatuses for a right to attempt a firmware update;
in response to obtaining, at the information handling apparatus, the right to attempt the firmware update:
calculating, at the information handling apparatus, a likelihood of a successful firmware update with an available firmware payload; and
in response to determining that the likelihood of a successful firmware update is above a threshold, downloading, to the information handling apparatus, the firmware payload and using the firmware payload to update firmware on the information handling apparatus;

computing, at the information handling apparatus, a new block for the information handling apparatus based on results of the firmware update;
updating, at the information handling apparatus, the ledger by adding the new block; and
starting, from the information handling apparatus, a competition between the other of the plurality of information handling apparatuses to obtain the right to attempt the firmware update, wherein starting a competition comprises broadcasting the ledger to the plurality of information handling apparatuses,
wherein calculating a likelihood of a successful firmware update with an available firmware payload comprises calculating a possibility of a successful update based on update statistics of information handling apparatuses of the plurality of information handling apparatuses that have previously computed a new block.

2. The method of claim 1, wherein the available firmware payload comprises a firmware payload for the plurality of information handling apparatuses.

3. The method of claim 1, wherein an initial block within the ledger comprises a first data address via which the firmware payload is downloadable by the plurality of information handling apparatuses.

4. The method of claim 3, wherein the new block comprises a second data address which is different from the first data address, the second data address comprising an address of the information handling apparatus of the plurality of information handling apparatuses comprising a copy of the firmware payload.

5. The method of claim 1, wherein the plurality of information handling apparatuses is divided into a plurality of groups by criticality of workloads and competing for a right to attempt a firmware update, calculating the likelihood of a successful firmware update, downloading the firmware payload, attempting the firmware update, computing the new block, updating the ledger and starting a competition are repeated for one of the plurality of groups with a lower criticality of workloads before being performed for other ones of the plurality of groups with a higher criticality of workloads.

6. The method of claim 5, wherein a failure in updating the firmware in a first group of the plurality of groups halts updating the firmware for other of the plurality of groups, wherein the failure in updating the firmware in the first group comprises determining that a percentage of the plurality of information handling apparatuses with a successful firmware update in the first group is below a group update threshold.

7. The method of claim 1, wherein the information handling apparatus obtaining the right to attempt the firmware update comprises the information handling apparatus computing an answer to a problem faster than other of the plurality of information handling apparatuses.

8. The method of claim 1, further comprising:
prior to calculating the likelihood of a successful firmware update, checking the ledger to determine if a new firmware payload is available; and
in response to determining that the new firmware payload is available, calculating the likelihood of the successful firmware update.

9. The method of claim 1, further comprising:
determining if the firmware update was successful; and
in response to determining that the firmware update was not successful, triggering a firmware recovery, wherein computing the new block comprises adding information to the new block indicative of the unsuccessful firmware update.

10. The method of claim 1, further comprising, prior to the firmware update, triggering a virtual machine ("VM") running on the information handling apparatus to temporarily migrate to another information handling apparatus of the plurality of information handling apparatuses during the firmware update.

11. The method of claim 1, wherein competing for the right to attempt a firmware update comprises competing for the right to attempt a firmware update in response to determining from the received ledger that the information handling device has not previously obtained the right to attempt the firmware update, and computing the new block for the information handling apparatus based on the results of the firmware update comprises updating a firmware update log with the results of the firmware update and adding configuration information of the information handling apparatus.

12. A system comprising:
a first information handling apparatus; and
a plurality of second information handling apparatuses interconnected to each other by a communication network;
wherein the first information handling apparatus is adapted to:
generate an initial block;
initialize a ledger based on the initial block; and
broadcast the ledger to the plurality of second information handling apparatuses; and
each of the plurality of second information handling apparatuses adapted to:
compete for a right to attempt a firmware update, by at least a portion of the plurality of the second information handling apparatuses;
in response to one of the plurality of the second information handling apparatuses obtaining the right to attempt the firmware update:
calculate a likelihood of a successful firmware update with an available firmware payload; and
in response to determining that the likelihood of a successful firmware update is above a threshold, download the firmware payload and using the firmware payload to update firmware on the one of the second information handling apparatuses;
compute a new block for the one of the second information handling apparatuses based on results of the firmware update;
update the ledger by adding the new block; and
start a competition between other of the plurality of second information handling apparatuses to obtain the right to attempt the firmware update, wherein starting a competition comprises broadcasting the ledger to the plurality of information handling apparatuses,
wherein calculating a likelihood of a successful firmware update with an available firmware payload comprises calculating a possibility of a successful update based on update statistics of information handling apparatuses of the plurality of information handling apparatuses that have previously computed a new block.

13. The system of claim 12, wherein the initial block within the ledger comprises a first data address via which the firmware payload is downloadable by the plurality of second information handling apparatuses.

14. The system of claim 13, wherein the new block comprises a second data address which is different from the first data address, the second data address comprising an address of the one of the plurality of second information handling apparatuses comprising a copy of the firmware payload.

15. The system of claim 12, wherein the one of the plurality of second information handling apparatuses obtaining the right to attempt the firmware update comprises the one of the plurality of second information handling apparatuses computing an answer to a problem faster than other of the plurality of second information handling apparatuses.

16. The system of claim 12, wherein each of the plurality of second information handling apparatuses, when having a right to attempt the firmware update, is adapted to:
prior to calculating the likelihood of a successful firmware update, check the ledger to determine if a new firmware payload is available;
in response to determining that the new firmware payload is available, calculate the likelihood of the successful firmware update;
determine if the firmware update was successful; and
in response to determining that the firmware update was not successful, trigger a firmware recovery,
wherein computing the new block comprises adding information to the new block indicative of the unsuccessful firmware update.

17. A program product comprising a computer-readable storage medium and program code, the program code being configured to be executable by a processor to perform operations comprising:
receiving a broadcast comprising a ledger;
competing, at an information handling apparatus of a plurality of information handling apparatuses, with other of the plurality of information handling apparatuses, for a right to attempt a firmware update;
in response to obtaining, at the information handling apparatus, the right to attempt the firmware update:
calculating, at the information handling apparatus, a likelihood of a successful firmware update with an available firmware payload; and
in response to determining that the likelihood of a successful firmware update is above a threshold, downloading, to the information handling apparatus, the firmware payload and using the firmware payload to update firmware on the information handling apparatus;
computing, at the information handling apparatus, a new block for the information handling apparatus based on results of the firmware update;
updating, at the information handling apparatus, the ledger by adding the new block; and
starting, from the information handling apparatus, a competition between the other of the plurality of information handling apparatuses to obtain the right to attempt the firmware update, wherein starting a competition comprises broadcasting the ledger to the plurality of information handling apparatuses,
wherein calculating a likelihood of a successful firmware update with an available firmware payload comprises calculating a possibility of a successful update based on update statistics of information handling apparatuses of the plurality of information handling apparatuses that have previously computed a new block.

18. The method of claim 7, wherein in response to the information handling apparatus obtaining the right to attempt the firmware update, the information handling device broadcasts the computed answer to the other of the plurality of information handling apparatuses and the other of the plurality of information handling apparatuses determine if the computed answer is correct, wherein, in response to the other of the plurality of information handling apparatuses determining that the computed answer is correct, the other of the plurality of information handling apparatuses stop competing for right to attempt the firmware update, and wherein, in response to the other of the plurality of information handling apparatuses determining that the answer is not correct, the other of the plurality of information handling apparatuses continue to attempt compute an answer to the problem faster than other of the plurality of information handling apparatuses.

* * * * *